United States Patent [19]

Green

[11] Patent Number: 4,504,343
[45] Date of Patent: Mar. 12, 1985

[54] METHOD OF MAKING COMPOSITE MEMBER WITH TRANSVERSE FIBERS

[75] Inventor: Andrew Green, Fort Worth, Tex.

[73] Assignee: Composite Technology, Inc., Saginaw, Tex.

[21] Appl. No.: 494,955

[22] Filed: May 16, 1983

[51] Int. Cl.$^3$ .......................... B32B 1/00; B32B 17/00
[52] U.S. Cl. .................................... 156/177; 156/205; 428/110; 428/182
[58] Field of Search ............... 428/107, 105, 109, 110, 428/114, 113, 182, 179; 156/177, 178, 179, 181, 205, 200, 210, 209, 220, 265, 266, 324, 206, 207; 264/258, 286

[56] References Cited

U.S. PATENT DOCUMENTS 4,061,806 12/1977 Lindler et al. .......................... 428/35
4,283,446 8/1981 McLain ................................. 428/36
4,460,633 7/1984 Kobayashi et al. ................. 428/110

Primary Examiner—Michael Ball
Attorney, Agent, or Firm—James E. Bradley

[57] ABSTRACT

A composite member is formed having improved strength and load carrying abilities by drawing a web of backing material toward a pair of primary rollers. A layer of transverse unidirectional filaments is laid down onto the backing web and a web of unidirectional filaments is drawn through the primary rollers simultaneously with the transverse layer and web of backing material. A resin is applied to the web of materials exiting the primary rollers and a second transverse layer of unidirectional filaments is laid onto the top of these materials to form a composite web. The composite web of materials is drawn to an oven where it is shaped and cured to produce the finished composite member. The finished member has a center ply of unidirectional filaments which is encapsulated by upper and lower transverse layers of unidirectional filaments. The transverse layers retain the shape of the unidirectional filaments, adding to the strength of the finished member.

6 Claims, 5 Drawing Figures

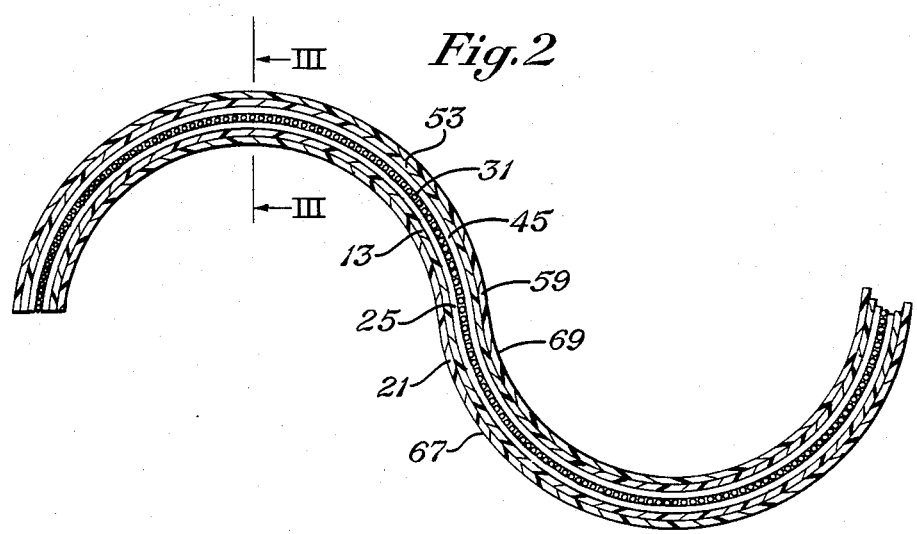
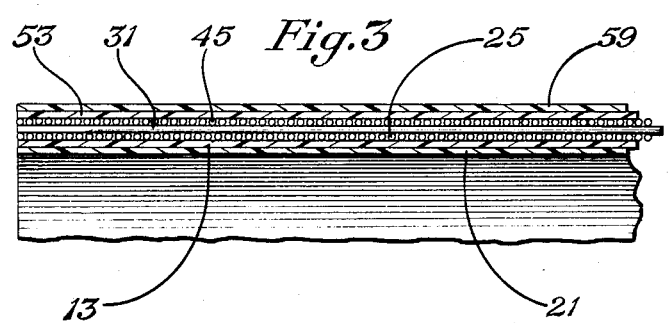
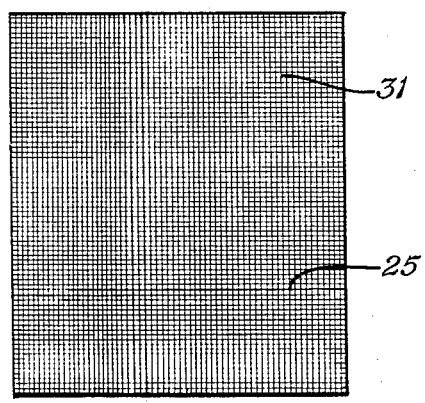
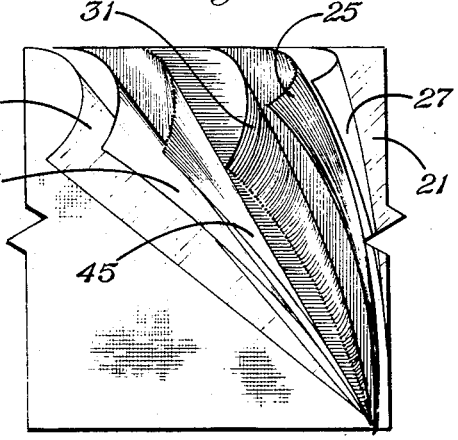

form additional objects, features and advantages will be apparent in the written description which follows.

METHOD OF MAKING COMPOSITE MEMBER WITH TRANSVERSE FIBERS

BACKGROUND OF THE INVENTION

The present invention relates to manufacturing of composite members, and in particular to a method for manufacturing corrugated fiberglass members having improved strength and stiffness.

Fiberglass panels are commonly constructed by using short fiberglass fibers or filaments and a resin. The fibers consist of chopped strands less than about 2 inches in length which are randomly arranged in the panel. The panel is molded into the shape of a corrugated member in a continuous process. Such fiberglass designs are not intended to bear heavy loads since the transfer of loads through the chopped strands in the panel is haphazzard.

Another fiberglass construction technique uses a layer of continuous longitudinal unidirectional filaments and a layer of woven fiberglass filaments, known as woven roving, to lend strength to the article. See, for example, U.S. Pat. No. 4,029,172. This method produces stronger than conventional fiberglass panels but has some disadvantages in that the weaving of fiberglass filaments is expensive and results a high resin content in the panel produced.

There exists a need, therefore, for a fiberglass construction method which produces a panel which resists changes in shape when stressed and which maintains the stiffness and strength of the corrugation.

There exists a need for such a process which will develop corrugated fiberglass panels with greater strength and stiffness than that of conventional fiberglass panels utilizing random chopped strands or additional layers of woven fiberglass filaments.

There exists a need for such a method which can be operated as a continuous production process which produces a panel with optimum load bearing capability at a minimum of additional cost.

SUMMARY OF THE INVENTION

In this invention, a primary backing web which is preferably a veil material is drawn toward a primary bath of resin. A first transverse layer of unidirectional filaments is laid down on the primary web backing as the web is drawn toward the bath. A web of longitudinal unidirectional filaments is drawn through the bath of resin simultaneously with the first transverse layer and primary backing web to impregnate the filaments with resin. A second transverse layer of unidirectional filaments is then laid down on top of the longitudinal unidirectional filaments. Preferably, a secondary web of veil material is then drawn through a secondary bath of resin simultaneously with the second transverse fibrous layer, longitudinal unidirectional filaments, first transverse layer and first web of veil material to form a composite web. The composite web is then shaped and cured in an oven.

The longitudinal unidirectional filaments are preferably continuous glass fibers which run the length of the member being constructed. The transverse layers preferably contain a plurality of unidirectional fiberglass filaments arranged substantially perpendicular to the longitudinal axis of the longitudinal fiberglass filaments.

The apparatus of the invention used to construct the members includes a pair of primary rotatable rollers adapted for receiving a primary web of veil material and a means for laying down a first transverse unidirectional layer onto the primary web of veil material as the veil material is drawn toward the primary rollers. Means are provided for supplying a web of longitudinal filaments to the primary rollers simultaneously with the first transverse layer and primary web of veil material. A resin applicator applies resin to the longitudinal filaments, first transverse layer and primary web of veil material as the unidirectional filaments, first transverse layer and primary web of veil material exit the primary rollers. Means are provided for laying down a second transverse unidirectional layer onto the longitudinal filaments. A pair of secondary rotatable rollers receive the longitudinal filaments, first transverse layer and primary web of veil. A second resin applicator applies resin to the second transverse layer, longitudinal filaments, first transverse layer and primary web of veil as these materials enter the secondary rollers. The members thus formed are received in an oven where they are cured and shaped to produce the finished members.

The means for laying down the transverse layers can be rapier weaving devices adapted to apply filaments oriented substantially perpendicular to the longitudinal axis of the unidirectional fiberglass filaments.

Each of the finished composite members produced by the method and apparatus of the invention has a center ply of unidirectional longitudinal filaments made up of continuous fibers running the length of the member. Upper and lower transverse unidirectional layers surround the center ply of unidirectional longitudinal filaments. The transverse layers are comprised of filaments oriented perpendicular to the unidirectional longitudinal filaments. The center ply and upper and lower transverse layers are impregnated with resin to form the composite member. The upper and lower transverse layers which run perpendicular to and encapsulate the longitudinal unidirectional fibers hold the shape of the corrugation while the longitudinal fibers are stressed, thereby increasing the strength and stiffness of the corrugation.

Additional objects, features and advantages will be apparent in the written description which follows.

BRIEF DESCRIPTION OF THE DRAWINGS

FIG. 2 is a partial transverse cross-sectional view of a composite corrugated member formed in accordance with the principles of the present invention.

FIG. 3 is a partial cross-sectional view of the composite member of FIG. 2 taken along lines III—III.

FIG. 4 is a top view of the first transverse layer of the composite member taken at the point indicated by the arrow in FIG. 1.

FIG. 5 is a schematic side view of the composite web formed by the apparatus of FIG. 1 with the various layers shown spread apart.

DETAILED DESCRIPTION OF THE INVENTION

Figure 1:
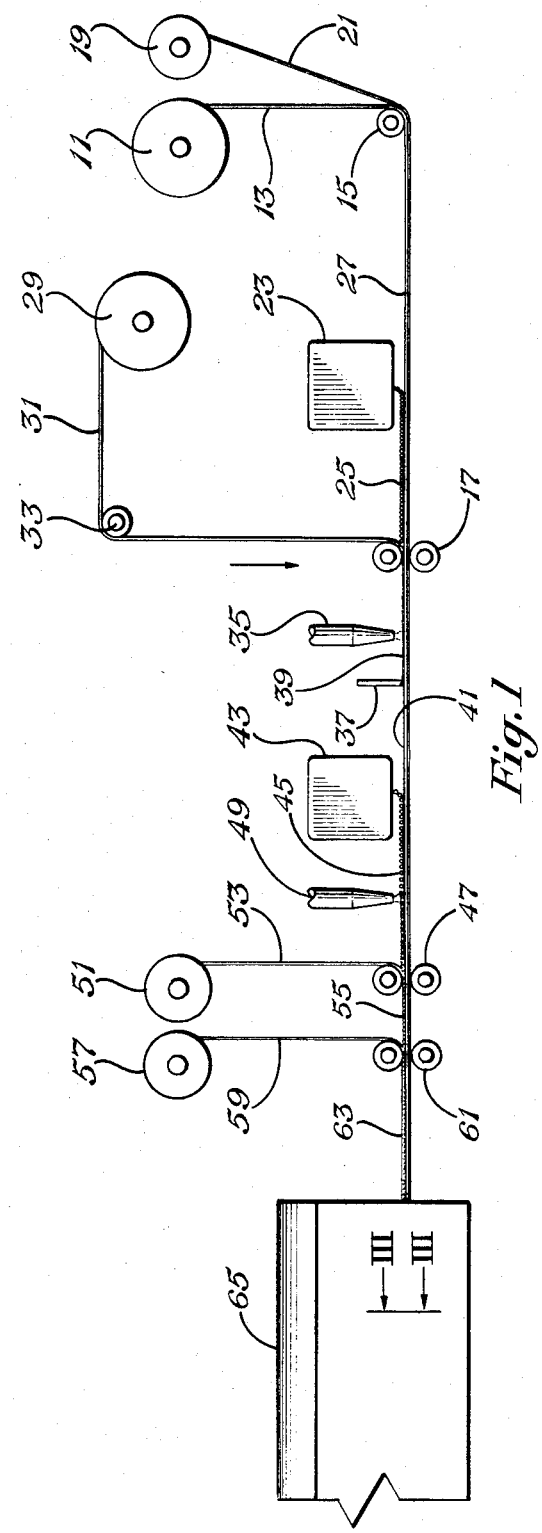
FIG. 1 is a schematic illustrating a method and apparatus used in forming composite members in accordance with this invention.

Referring to FIG. 1, the apparatus for forming composite members of the invention is shown and includes a supply roll 11 for supplying a primary backing web of veil material. The veil material is known to those skilled in the art and is preferably a polyester felt. Veil is a thin, porous material which is usually an organic material but can be made from various synthetic polymers, or even natural fibers. The veil web 13 passes around a roller 15 and is drawn toward a pair of primary rotatable rollers 17.

A supply roll 19 can also be provided for supplying a web of impermeable thermoplastic film which passes around roller 15 and serves as a backing for the veil web 13 as the webs are drawn toward the primary roller 17. The roll 19 is preferably Mylar, a trademark for a thermoplastic polyester film that is the reaction product of terephthalic acid and ethylene glycol. Other suitable films include synthetic polymers such as polyvinylidene chloride film, polyethylene film, cellulose acetate film, and regenerated cellulose (cellophane). The thermoplastic film 21 forms a base for receiving the fiberglass resins, as will be explained, and can be peeled away from the finished product.

The equipment for forming the composite member of the invention also includes a first means 23 for laying down a first transverse layer 25 of unidirectional filaments onto the primary web 27 of veil material as the veil material 27 is drawn toward the primary roller 17. Preferably, the first means 23 is a rapier weaving device of the type used in the textile industry which is used to lay down a plurality of cut reinforcing filaments arranged substantially perpendicular to the longitudinal axis of the webs 21, 27. Suitable rapier weaving devices are available from Dornier Manufacturing Company of West Germany. The filaments of layer 25 are pulled off in bundles or rovings and laid flat. The filaments of layer 25 extend the full width of the web, are closely spaced and substantially in a single plane. They are not woven with filaments running in other directions as in a woven roving.

Although the first transverse layer 25 is preferably supplied by the first rapier weaver 23 as a plurality of cut filaments, layer 25 could be comprised of a knitted material. This material has a plurality of cut transverse filaments extending the width of the web and loosely joined together by thin threads to maintain a flat web with a plurality of unidirectional parallel filaments.

A spool 29 is provided for supplying a web of unidirectional longitudinal reinforcing filaments 31 to the primary roller 17 simultaneously with the first transverse layer 25, primary web of veil material 27 and thermoplastic film web 21. The unidirectional filaments are all oriented in the same direction, parallel to the length of the webs drawn from rolls 11, 19. The unidirectional filaments 31, like the filaments of transverse layer 25 are preferably pure fiberglass filaments ranging in size from about 20 to about $50 \times 10-5$ inch. Each filament is continuous for all practical purposes. The filaments are laid in a flat web substantially in a single plane. There is only one layer of filaments in the web drawn from the spool 29 over the roller 33 through the primary rollers 17.

The first transverse layer 25 is oriented substantially perpendicular to the longitudinal fiberglass filaments 31 supplied from spool 29. FIG. 4 is a view looking down on the unidirectional fiberglass filaments 31 in the direction of the arrow shown in FIG. 1 and shows the first transverse layer running perpendicular to the unidirectional fiberglass filaments 31.

A resin applicator 35 (FIG. 1) is provided for applying resin to the unidirectional filaments 31, first transverse layer 25, primary web of veil material 27 and thermoplastic film 21 as the various materials exit the pair of primary rollers 17. The resin which is dispensed by applicator 35 can be a structural fiberglass resin of the type known in the art which is mixed with a catalyst and dispensed. A bar 37 or plate allows a resin bath 39 to be created beneath the applicator 35 so that the materials exiting the primary rollers 17 are impregnated in the bath 39. Polyester or vinylester resins especially designed for strength and corrosion resistance are used to bind the glass fibers making up the composite web which are impregnated in the bath 39. Plate 37, in addition to providing a pooling effect to create the bath 39, is appropriately spaced to limit the resin content of the composite web 41 exiting the bath 39.

A second means 43 is provided for laying down a second transverse layer 45 of unidirectional filaments onto the layer of longitudinal filaments 31, as shown in FIG. 1. The second means 43 can also be a rapier weaving device identical to the first means 23 which is adapted to lay down a plurality of filaments substantially perpendicular to the longitudinal axis of the composite web 41 and the continuous longitudinal filaments 31. The center ply of unidirectional filaments 31 and upper and lower transverse layers 45, 25 make up the total fiber count of the finished composite member. Preferably about 25% to 33% of the total fiber count is in the transverse direction comprised by transverse layers 25, 45.

A pair of secondary rotatable rollers 47 receive the second transverse layer 45, longitudinal filaments 31, first transverse layer 25, primary web of veil material 27 and thermoplastic film backing 21. A second resin applicator 49 supplies resin to the composite web made up of the second transverse layer 45, undirectional filaments 31, first transverse layer 25, primary web of veil material 27 and thermoplastic film backing 21. The resin dispensed by applicator 49 is a resin and catalyst. Applicator 49 can also dispense ultraviolet stabilized gel coat resins that provide maximum weathering capability where the surface of the composite member will be exposed to the effects of sun and rain. The preferred structural resin and gel coat resin are marketed under the trademark "ASHLAND 6858". The gel coat is a filled resin system that has pigment, fillers, and ultraviolet stabilizers.

A veil spool 51 provides a second web of veil material 53 identical to primary web 27. The second web of veil material 53 is drawn through the secondary rotatable rollers 47 on top of the second transverse layer 45, longitudinal filaments 31, first transverse layer 25, first web of veil material 27 and thermoplastic film backing 21 to form a composite web 55 exiting rollers 47.

A spool 57 provides a top layer of thermoplastic film 59 of Mylar which passes through a pair of rotatable rollers 61 simultaneously with the composite web 55 exiting rollers 47. The composite web 63 exiting rollers 61 is pulled on a suitable corrugation mold (not shown) and through an oven 65 where it is heated and shaped to form the fiberglass member using techniques known in the art. The corrugations run parallel with the unidirectional filaments 31. Traction means (not shown) at the exit of the oven pulls the entire composite web through the process continuously.

The operation of the present invention will now be described with reference to FIG. 1. A web of veil material 13 which is backed by a web of thermoplastic film 21 is drawn toward a pair of primary rotatable rollers 17 by passing around rollers 15. A first transverse layer 25 is laid onto the veil web 27 as the web 27 is drawn toward the primary rollers 17. A web of longitudinal filaments 31 is drawn through the primary rotatable roller 17 on top of the transverse layer 25, with the longitudinal filaments 31 being oriented parallel to the length of the web material being drawn through the primary roller 17.

A resin is applied to the composite web exiting the roller 17 through a resin applicator 35. The layers of material are impregnated by the resin bath 39 formed between the applicator 35 and plate 37 and on top of the backing 21 of Mylar. The composite web 41 exiting the first resin bath 39 is drawn toward a secondary pair of rotatable rollers 47. A second transverse layer 45 is laid on top of the longitudinal filaments 31 as the composite web 41 is drawn toward the rollers 47.

A second resin applicator 49 applies resin, either structural resin or gelcoat resin to the composite web. A second web of veil material 53 supplied from a veil spool 51 is drawn through the secondary rollers 47 simultaneously with the composite web passing under the second resin applicator 49. The composite web 55 thus formed is drawn through rollers 61 simultaneously with a backing web 59 supplied from spool 57. The composite web 63 exiting roller 61 is drawn into an oven 65 where the composite web is molded to shape the corrugations of the fiberglass member, and heated and cured in a continuous process. The thermoplastic film backings 21 and 57 are continuously stripped from the composite member at the exit of the oven after the member has cured.

FIG. 2 is a cross-sectional view of a composite member of the invention. The composite member includes a center ply of unidirectional longitudinal filaments 31, which is encapsulated by first and second transverse unidirectional filament layers 25, 45. First and second webs of veil material 13, 53 serve to push the structural filaments away from the outside surfaces 67, 69 of the finished member. This increases the life of the composite member by helping to keep corrosive elements away from the filaments.

FIG. 3 is a partial cross-sectional view taken along lines III—III in FIG. 2 and shows the substantially perpendicular arrangement of the transverse unidirectional layers 25, 45 with respect to the center ply of unidirectional longitudinal filaments 31. FIG. 5 shows a composite member with the various layers peeled back.

The invention provided has significant advantages. The composite members have continuous, longitudinal unidirectional filaments placed parallel to the direction of loading to provide overall load carrying ability. To help the unidirectional filaments retain their shape under stress, upper and lower layers of transverse unidirectional filaments are applied perpendicular to and encapsulate the longitudinal filaments. By eliminating the need for woven roving, a composite member is produced with a minimum resin content which produces greater overall strength per weight. The lower resin content and elimination of woven components adds to the economy of the process.

While the invention has been shown in only one of its forms, it is not thus limited but is susceptible to various changes and modifications without departing from the spirit thereof.

I claim:

1. A method of constructing a composite member consisting essentially of a corrugated panel having a center layer of longitudinal unidirectional filaments running parallel with the corrugations, sandwiched between transverse layers of parallel, unidirectional filaments, impregnated with resin, and optionally including two layers of organic, porous veil material sandwiching the center and transverse layers, comprising the steps of:
   drawing a backing web toward a primary bath of resin;
   laying down a first transverse layer of parallel, unidirectional filaments onto said backing web transverse to the directional of travel of said backing web as said backing web is drawn toward said bath;
   drawing a web of longitudinal unidirectional filaments through said bath of resin parallel with the direction of travel of said backing web simultaneously with said first transverse layer and said backing web to impregnate said longitudinal filaments and first transverse layer with resin;
   laying down a second transverse layer of parallel, unidirectional filaments onto and transverse to said longitudinal filaments;
   drawing said second transverse layer, longitudinal filaments, first transverse layer and web of backing material through a secondary bath of resin to form a composite web; and
   shaping and curing the composite member thus formed into a corrugated panel with the corrugations running parallel with the longitudinal filaments and with the filaments in the transverse layers remaining parallel with each other.

2. A method of constructing a fiberglass member consisting essentially of a corrugated panel having a center layer of longitudinal unidirectional filaments running parallel with the corrugations, sandwiched between transverse layers of parallel, unidirectional filaments, impregnated with resin, and optionally including two layers of organic, porous veil material sandwiching the center and transverse layers, comprising the steps of:
   drawing a backing web of impermeable thermoplastic film toward a primary bath of fiberglass resin;
   laying down a first transverse layer of parallel, fiberglass filaments transverse to the direction of travel of the web as said web is drawn toward said bath;
   drawing a web of longitudinal unidirectional fiberglass filaments through said bath of fiberglass resin transverse to the first transverse layer simultaneously with said first transverse layer to impregnate said fiberglass filaments with resin;
   laying down a second transverse layer of parallel, unidirectional fiberglass filaments onto said longitudinal fiberglass filaments and parallel with the filaments of said first transverse layer; and
   shaping and curing the composite fiberglass member thus formed into a corrugated panel with corrugations running parallel with the longitudinal filaments and with the filaments in the transverse layers remaining parallel with each other.

3. The method of claim 2, wherein said longitudinal fiberglass filaments are continuous glass fibers running parallel to the longitudinal axis of the web of backing material.

4. The method of claim 2, wherein said transverse layers contain a plurality of fiberglass filaments arranged substantially perpendicular to said longitudinal fiberglass filaments.

5. The method of claim 2, wherein each of said transverse layers is made up of cut fiberglass filaments arranged substantially in a single plane, each filament being oriented perpendicular to said longitudinal fiberglass filaments.

6. A method of constructing a corrugated panel with a center consisting essentially of a corrugated panel having a center layer of longitudinal unidirectional filaments running parallel with the corrugations, sandwiched between transverse layers of parallel, unidirectional filaments, impregnated with resin, and optionally including two layers of organic, porous veil material sandwiching the center and transverse layers, comprising the steps of:

laying down a first transverse layer of parallel unidirectional filaments with each of the filaments perpendicular to the corrugations;

laying down a layer of longitudinal unidirectional filaments with each of the filaments parallel with the corrugations;

laying down a second transverse layer of parallel unidirectional filaments onto the layer of longitudinal filaments, with each of the filaments of the second transverse layer being parallel with the filaments of the first transverse layer and perpendicular to the longitudinal filaments;

impregnating the layers with resin; and shaping and curing the composite member thus formed into a corrugated panel while maintaining the filaments in the transverse layers parallel with each other.

* * * * *